United States Patent
Messersi'

(10) Patent No.: US 10,144,542 B2
(45) Date of Patent: Dec. 4, 2018

(54) ROTARY WRAPPING MACHINE FOR PACKAGING OBJECTS

(71) Applicant: Messersi' Packaging SRL, Barbara (AN) (IT)

(72) Inventor: Maurizio Messersi', Serra de Conti (IT)

(73) Assignee: MESSERSI' PACKAGING SRL, Barbara (AN) (IT)

( * ) Notice: Subject to any disclaimer, the term of this patent is extended or adjusted under 35 U.S.C. 154(b) by 880 days.

(21) Appl. No.: 14/386,391

(22) PCT Filed: Feb. 7, 2014

(86) PCT No.: PCT/IB2014/058853
§ 371 (c)(1),
(2) Date: Sep. 19, 2014

(87) PCT Pub. No.: WO2014/128587
PCT Pub. Date: Aug. 28, 2014

(65) Prior Publication Data
US 2015/0047301 A1 Feb. 19, 2015

(30) Foreign Application Priority Data
Feb. 20, 2013 (IT) .............................. MI2013A0234

(51) Int. Cl.
*B65B 45/00* (2006.01)
*B65B 11/02* (2006.01)
(Continued)

(52) U.S. Cl.
CPC ............ *B65B 11/025* (2013.01); *B65B 41/16* (2013.01); *B65B 45/00* (2013.01); *H02J 17/00* (2013.01); *H02J 50/10* (2016.02)

(58) Field of Classification Search
CPC ... B65B 11/02; B65B 11/025; B65B 2210/16; B65B 2210/18; H02K 41/00; H02K 41/02; H02K 41/031
(Continued)

(56) References Cited

U.S. PATENT DOCUMENTS 6,766,630 B2    7/2004  Rutten
7,343,722 B1    3/2008  Rutten
(Continued)

FOREIGN PATENT DOCUMENTS

CN    202106588 U    1/2012
EP    0289784 A1    11/1988
EP    0811554 A1    12/1997
(Continued)

OTHER PUBLICATIONS

PCT International Search Report and Written Opinion dated Apr. 14, 2014, from which the instant application is based, 6 pgs.
Search Report and Written Opinion dated Sep. 9, 2013 for related application (priority application) IT MI20130234 , 6 pgs.

*Primary Examiner* — Andrew M Tecco
*Assistant Examiner* — Chelsea Stinson
(74) *Attorney, Agent, or Firm* — Fredrikson & Byron, P.A.

(57) ABSTRACT

A rotary wrapping machine (30, 110) for packaging products by means of a film unwound from a reel comprises a frame (13, 113) carrying a dispensing unit (19, 119) which is electrically controlled to dispense the packaging film from a reel of film present in the dispensing unit (19, 119). The dispensing unit is supported on the frame so as to be driven rotationally along a closed path around a packaging zone (38, 138) which contains a product to be wrapped with the film. Along the closed path there is a power supply antenna (25, 125) which is connected to an antenna power supply unit (26, 126) for transferring, by means of electrical induction, electric power to a corresponding receiver (28, 128)
(Continued)

which is movable along the antenna together with the said dispensing unit and which supplies in turn electric power to the dispensing unit.

15 Claims, 3 Drawing Sheets

(51) Int. Cl.
*H02J 17/00* (2006.01)
*B65B 41/16* (2006.01)
*H02J 50/10* (2016.01)

(58) Field of Classification Search
USPC ................. 53/203, 441, 399, 588; 310/10
See application file for complete search history.

(56) References Cited

U.S. PATENT DOCUMENTS

| | | | |
|---|---|---|---|
| 7,707,801 B2* | 5/2010 | Lancaster, III | B65B 11/025 53/399 |
| 2003/0230941 A1* | 12/2003 | Jacobs | B60L 15/38 310/12.19 |
| 2004/0119340 A1 | 6/2004 | Nishino | |
| 2007/0013328 A1* | 1/2007 | Shemm | H02K 41/031 318/135 |
| 2012/0180433 A1 | 7/2012 | Cere Mauro | |

FOREIGN PATENT DOCUMENTS

| | | |
|---|---|---|
| GB | 2202414 A | 9/1988 |
| NL | 7407687 A | 12/1975 |

\* cited by examiner

ROTARY WRAPPING MACHINE FOR PACKAGING OBJECTS

RELATED APPLICATIONS

This application is a 35 U.S.C. 371 national stage filing from International Application No. PCT/IB2014/058853 filed Feb. 7, 2014, which claims priority to Italian Application No. MI2013A000234 filed Feb. 20, 2013, the teachings of which are incorporated herein by reference.

The present invention relates to an innovative rotary wrapping machine of the type used for packaging objects (such as packs on a pallet) using a strip of film.

Wrapping machines or stations which have a packaging head or unit which rotates along a circular path around the periphery of an object to be packaged and arranged in the centre of this path are known. The head unwinds a plastic film from a reel and wraps it around the object. If the width of the film is smaller than the height of the object, the machine may also perform a simultaneous displacement of the head along the object itself, so as to spirally wrap the film onto he object.

For rotary movement of the head, the machine may be provided with a motor-driven circular ring for axial rotation, the film dispensing unit being mounted on the inner periphery thereof. The ring may also comprise a balancing weight provided on it in a diametrically opposite position to the dispensing unit. The ring is in turn mounted on a motor-driven frame so as to impart to it the aforementioned simultaneous translational movement.

In a different embodiment, the ring is replaced by an annular rail along which the packaging unit or head in the form of a carriage travels.

In both cases, it is required to impart to the unit which rotates about the product to be packaged a driving force for operating the mechanisms present on this unit. This gives rise to evident problems in terms of the connection between the rotating unit and the stationary part of the machine.

In the prior art various solutions have been proposed, but are not entirely satisfactory. For example, it has been proposed using a stationary electric motor and a suitable rotary mechanical drive (for example with gearwheels, belts and/or chains) which transfers the mechanical energy to the head rotating about the product to be packaged. The mechanical drive is, however, somewhat complex, requires constant and costly maintenance and creates a large amount of inertia in the rotating system.

Moreover, the efficiency is often relatively poor and the mechanical drive is in any case subject to wear and malfunctions.

Owing to the use of a mechanical system, moreover, it is not possible to manage suitably unwinding mechanisms of a certain complexity, such as those equipped with means for adjustable pre-stretching of the film, and/or to mount on the head additional packaging devices.

Such a mechanical system is described for example in U.S. 2012/0180433.

NL7407687 describes a strap-tying machine with an annular rail along which a carriage which applies a fastening strap around packs of material travels. In said machine the carriage is moved using a linear electric motor where the annular rail is the stator and the carriage is the rotor. In this way the carriage is moved along the rail without using mechanical systems. There is, however, no possibility of powering devices on the carriage without the use of sliding contacts. NL7407687 therefore also describes the possibility of sliding contacts for powering windings of the linear motor which are positioned on the carriage. The carriage, however, is able to transport a strap only passively and therefore the system is totally unsuitable for use in a machine for wrapping products with film where various active devices for unwinding and tensioning the film may be present on the carriage.

In film wrapping machines the use of electric motors mounted directly on the unwinding unit for operation of the various associated mechanisms has also been proposed. These motors must obviously rotate together with the unwinding unit and it is therefore necessary to provide the rotating unit with an electric power supply.

In order to achieve this, in the prior art electrified rails and sliding contacts or batteries mounted directly on the rotating unit are used.

These systems, however, are unsatisfactory since they have various drawbacks, such as the cost and the need for constant maintenance (in particular in the case of sliding contacts, which are subject to considerable wear), large volume and high degree of inertia (especially in the case of a battery power supply).

In the case of battery-operated systems it is also necessary to consider the cost of the battery and the need to maintain and replace the batteries. Moreover, with batteries, there is the problem of having to perform periodic recharging thereof. In order to solve this latter problem it has also been proposed (for example in EP0811554) using a dynamo positioned on the rotating unit and operated by the same rotation of the unit. This however further increases the weight, complexity and need for maintenance of the system.

All the aforementioned known systems also impose fairly stringent limitations in terms of the size of the packets which can be processed.

The general object of the present invention is to provide an innovative wrapping machine which is able to overcome the drawbacks of the prior art, achieving also a smaller volume, less complex design and greater flexibility.

In view of this object, the idea which has occurred according to the invention is that of providing a wrapping machine for packaging products using a film unwound from a reel, comprising a frame carrying a dispensing unit which is electrically operated to dispense the packaging film from a reel of film present in the dispensing unit, the dispensing unit being supported on the frame so as to be driven rotationally along a closed path around a packaging zone which contains a product to be wrapped with the film, characterized in that a power supply antenna is present along said closed path and is connected to an antenna power supply unit for transferring, by means of electrical induction, electric power to a corresponding receiver which is movable along the antenna together with the said dispensing unit and which supplies in turn electric power to the dispensing unit.

In order to illustrate more clearly the innovative principles of the present invention and its advantages compared to the prior art, examples of embodiment applying these principles will be described below with the aid of the accompanying drawings. In the drawings.

Figure 1:
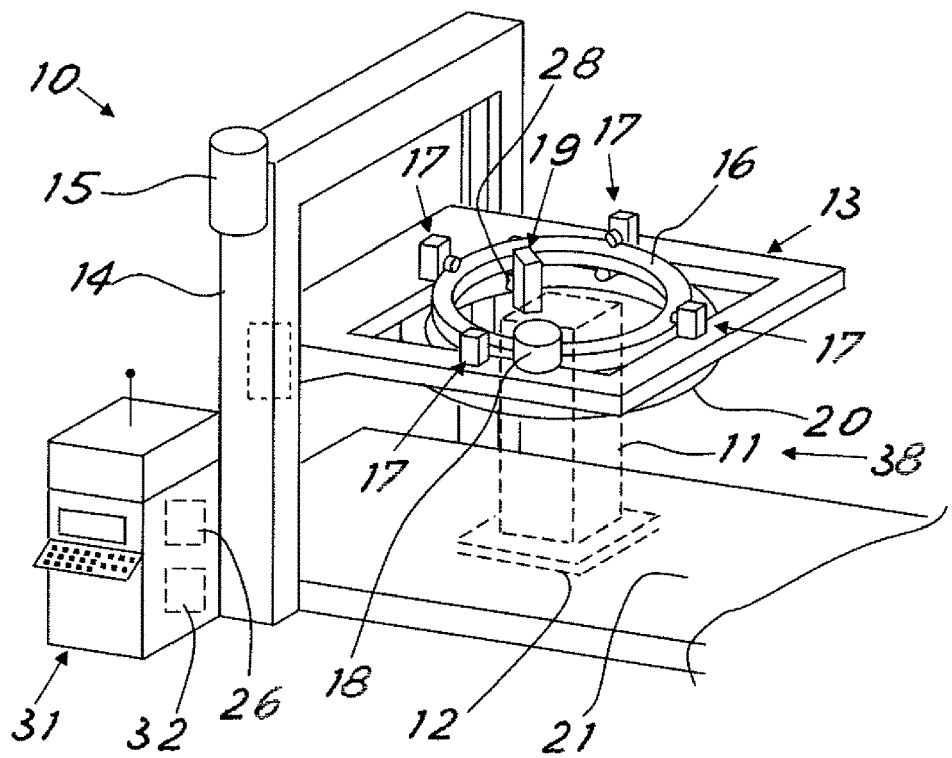
FIG. 1 shows a schematic perspective view of a first embodiment of a wrapping machine according to the invention.

With reference to the figures, FIG. 1 shows a wrapping apparatus or machine according to the invention, denoted generally by 10.

As will be clarified below, the apparatus 10 is designed to wrap a suitable strip of plastic film around an object 11 which is arranged in a packaging zone 38 of the machine. The introduction of the object into the packaging zone 38 (and optionally also its removal) may be performed for example by means of a conveying line 21 (advantageously, a belt conveyor or a rollerway).

The wrapping station forms a station for packaging products, which are for example palletized, as may be easily imagined by the person skilled in the art. In general, the object 11 may be formed by a set of products (for example boxes, bricks or the like) which are stacked on a transportation pallet 12 so as to form a parallelepiped structure to be packaged with the film, in order to fasten together all the products in a single pack. The wrapping machine 10 comprises a frame 13 carrying a dispensing unit 19 which is electrically controlled to dispense the packaging film from a reel of film present in the said dispensing unit.

In particular, the dispensing unit is supported on the frame 13 so as to be rotationally driven along a closed path around the packaging zone 38 which contains the product 11. In the case of the embodiment shown in FIG. 1, the path is circular and the movement of the dispensing unit 19 along it is obtained by means of a circular ring 16 which is supported on the frame 13 by means of guiding and sliding means 17 (suitably distributed along the circumference of the ring) which allow it to rotate axially about itself upon operation of a suitable electric motor 18.

Advantageously, the motor 18 is mounted on the frame and rotates the ring 16, engaging with the periphery thereof by means of a suitable system known per se (not shown in detail since it may be easily imagined by the person skilled in the art) such as a friction coupling (roller or the like) or a rack-and-pinion coupling.

For packaging of objects which are higher than the width of the strip of film, the frame 13 is advantageously displaceable in a direction transverse to the breadth of the closed path followed by the unit 19, so as to move along the packaging zone and wrap (also with several layers) the spiral film around the periphery of the object to be packaged. With a substantially horizontal path and a vertical displacement, as shown by way of example in Figure, the frame 13 is advantageously movable vertically along support columns 14 by means of a known drive unit 15.

As will be further clarified below, along the closed path followed by the dispensing unit on the frame 13 there is a power supply antenna 25 which is connected to an antenna power supply unit 26 for transferring, by means of electrical induction, electric power to a corresponding receiver 28 which is movable along the antenna together with the dispensing unit 19 and which supplies in turn electric power to the said dispensing unit. In particular, the machine shown in FIG. 1 is advantageously provided with an annular support 20 fixed to the frame 13 and seating the antenna. The support 20 is parallel to the path followed by the unit 19 during its rotation and, in particular, also has the form of a circular ring and is coaxial with the axis of rotation of the ring 16.

Advantageously, the receiver 28 travels at a short distance along the antenna in such a way as to be always inductively coupled with it.

Figure 2:
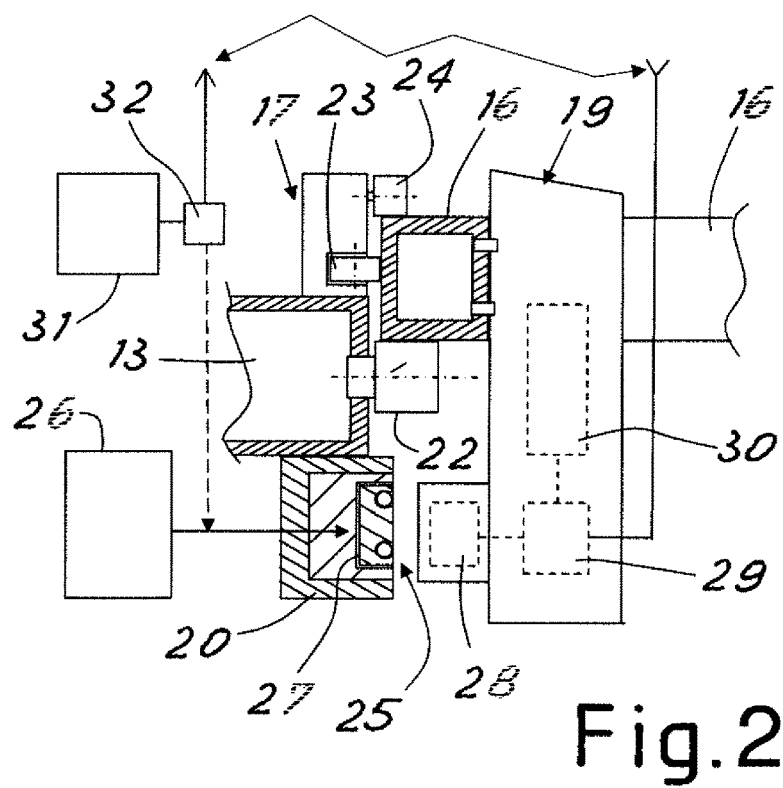
FIG. 2 shows a partial schematic view, on a large scale and cross-sectioned, of a part of the wrapping machine according to FIG. 1.

FIG. 2 shows schematically a radially sectioned part of the frame 13 with the rings 16 and 20 and the unit 19.

In this figure it can be clearly seen how the ring 16 is rotatably supported on the frame 13 by the guiding and sliding means 17 which, advantageously, comprise support rollers 22, lateral guide rollers 23 and, optionally, upper retaining rollers 24. The ring is thus properly guided so as to rotate about itself with a small degree of friction.

The annular support 20 has advantageously a seat which, along its entire circumference, contains the antenna 25 which is supplied with power by the power supply unit 26. The antenna 25 may be advantageously screened by a metallic screen 27 (for example made of aluminium) suitable for preventing the transmission of the electric field produced by the antenna in a direction other than the radial direction towards the centre of the ring or, in any case, towards the receiver 28 associated with the film dispensing unit 19.

In particular, the receiver 28 is situated facing the inner surface of the ring 20, at a short distance therefrom, so as to be coupled inductively with the antenna 25 and thus receive the electric energy produced by the power supply unit 26 and irradiated by the antenna 25.

Since the antenna is closed in the form of a ring around the travel path of the film dispensing unit, the receiver 28, which is integrally fixed to the unit 19, receives constantly the energy irradiated by the antenna whatever the position of the dispensing unit 19 along the path which it follows during its rotation around the packaging zone. The receiver 28 supplies the electric energy captured to a suitable device or electronic control unit 29 which is present on the dispensing unit. The control unit 29 then controls operation of an assembly 30 of motors and/or actuators present on the said unit.

In this way, the unit receives a suitable electric power supply for operation without the need for any physical connection with the stationary parts of the machine and may therefore rotate freely.

The voltage induced in the receiver is converted, if necessary, from a relatively high induction voltage (for example 500V) and a relatively high frequency (for example useful for the efficiency of the induction transfer) into a direct voltage with a value suitable for powering the circuits present in the dispensing unit. This direct voltage may be, for example, of the order of 48 V DC or less. The control circuit 29 may in turn comprise further voltage reducers for powering its internal circuits using the voltage received via the receiver 28, as may be easily imagined by the person skilled in the art. The wrapping machine 10 may advantageously comprise a central control unit 31 (substantially known per se in the art and therefore not further illustrated or described here) which among other things communicates with the control unit mounted on the unit 19 by means of wireless transmission. For this purpose, the central unit has a suitable transceiver unit 32. The wireless connection may use associated transmission antennas or may be conveyed via the said inductive coupling between antenna 25 and receiver 28 by suitably modulating the power supply of the antenna 25 with the data signal to be transmitted. The central unit 31 may also comprise a known input/output interface for an operator (for example a keyboard and a display).

By means of the same wireless transmission system it is also possible to perform transmission in the opposite direction, with the device 29 which modulates a data signal on the windings of the receiver 28 which are coupled with the antenna 25, such that the antenna 25 is used as a receiving antenna by the central unit 31 fixed to the ground.

Figure 3:
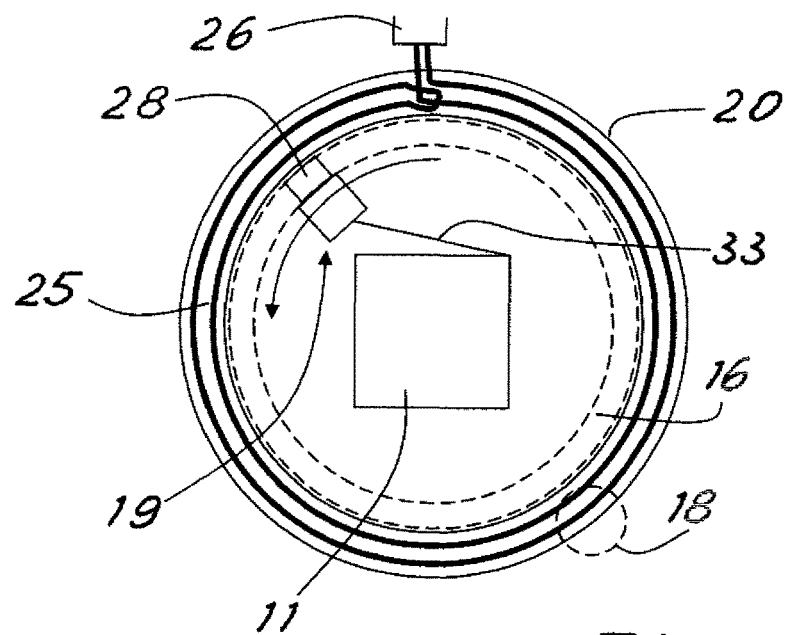
FIG. 3 shows a schematic plan view of the wrapping machine according to FIG. 1.

FIG. 3 shows schematically from above an operation involving wrapping of an object with the film (indicated by 33) supplied by the dispensing unit 19, while the assembly rotates with the motor-driven ring 16 about the object 11 and simultaneously travels in the vertical direction along the height of the object. The vertical movement may be a to- and fro movement so as to superimpose several layers of film and bring back eventually the dispensing unit into the starting position. The starting position corresponds, for example, to a position of the frame raised to a height higher than the top of the object to be packaged, such as to allow the object to move into and out of the packaging zone.

FIG. 3 also shows schematically a possible configuration of the antenna 25 designed as a continuous cable which forms an input loop and a return loop around the fixed ring 20. The two loops are connected together at a first end and at the other end (which, after a turn slightly greater than 360°, is superimposed on the first end), they are connected to the power supplier 26.

Although, for illustrative reasons, in FIG. 3 the two loops are both shown in the plane of the path followed by the dispensing unit, in reality they are advantageously superimposed on each other in parallel fashion so as to both face the receiver 28, as can be clearly seen in FIG. 2.

Figure 4:
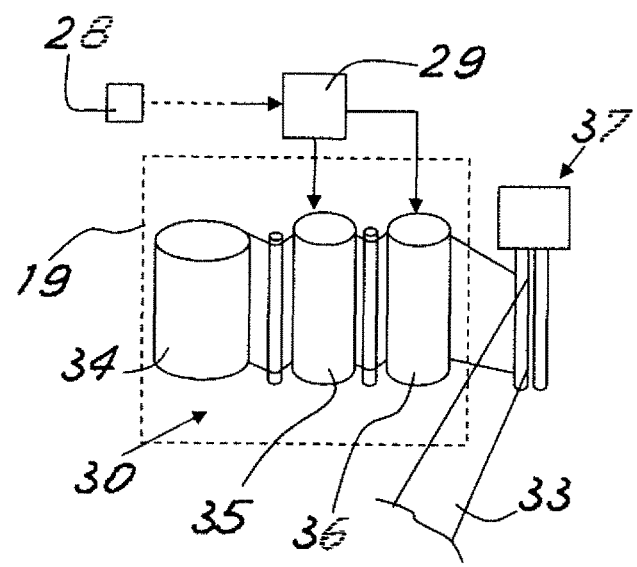
FIG. 4 shows a schematic view of a part for unwinding and dispensing the strip of film.

FIG. 4 shows schematically a possible embodiment of the rotating dispensing unit. This embodiment comprises the reel of film (indicated by 34) and at least two rollers 35 and 36 which allow feeding of the dispensed film and are independently motor-driven and controlled by the unit 29.

By adjusting the relative speed of rotation of the two rollers, the unit 29 may perform a desired pre-stretching of the film, so that it is tightly gripped around the wrapped object. Owing to the wireless communication between central unit 31 and mounted control unit, pre-stretching may also be dynamically controlled by the central unit 31 (manually by the operator or on the basis of automatic operating parameters) depending on desired operating requirements.

FIG. 4 also shows schematically a mechanism 37 (known per se and therefore not further illustrated or described in detail) which performs cutting and adjustment of the strip of film at the end and at the start of each wrapping operation. This mechanism is generally arranged on the frame 13 and rotates about its axis between a rest position and an operative position for gripping and then cutting the film when rotation of the unit 19 is stopped upon completion of the wrapping operation.

Figure 5:
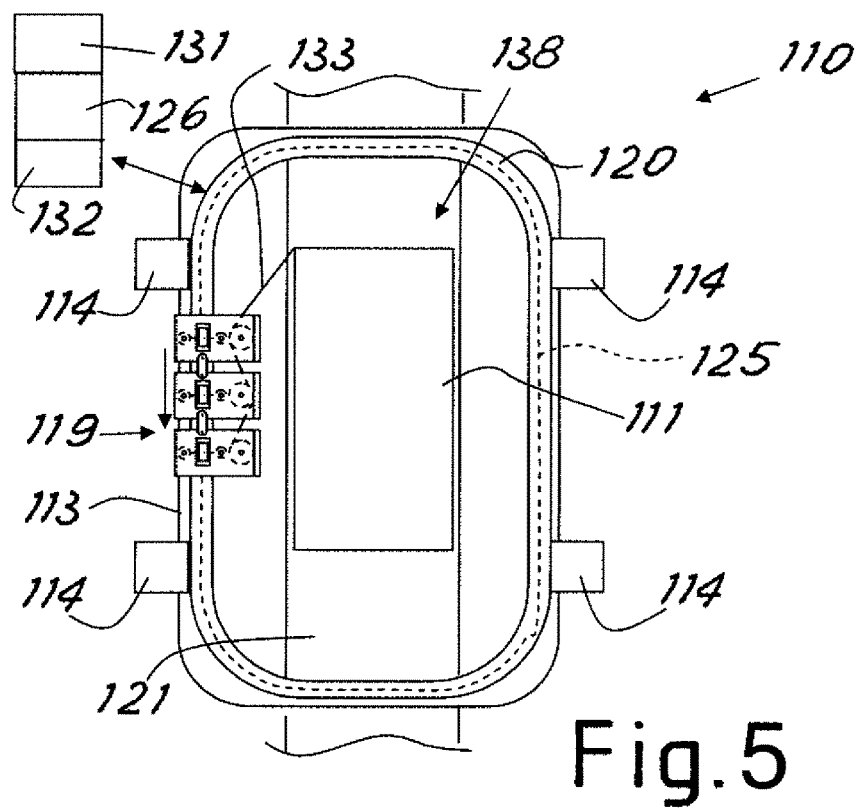
FIG. 5 shows a schematic plan view of a second embodiment of a wrapping machine according to the invention.

FIG. 5 shows a constructional variant of an apparatus according to the invention. For the sake of convenience, parts similar to those in the embodiment of FIG. 1 will be indicated by the same numbering increased by 100.

The apparatus according to FIG. 5, indicated generally by 110, comprises a unit 119 for controlled dispensing of the film 133 so as to wrap it around an object 111 which is conveyed into a packaging zone 138 in the apparatus, for example by means of a conveying line 121 (for example a conveyor belt or rollerway).

The dispensing unit is supported on the frame 13 so as to be rotationally driven along a closed path around the packaging zone 138 which receives the product.

Advantageously, the dispensing unit is designed in the form of a motor-driven carriage which travels along a rail 120 which follows the predefined closed path and is supported on the frame 113 (which may also coincide with the rail itself, if the rail is constructed in a sufficiently strong manner to be self-supporting).

The frame 113 is advantageously supported so as to be slidably driven in a direction transverse to the extension of the closed path followed by the carriage. In particular, with the closed path (and hence with the rail 120) substantially horizontal, the translational movement of the frame will be vertical, in the similar manner to the previous embodiment.

Advantageously, this translational movement is obtained by means of motor-driven columns 114 along the sides of the packaging zone 138.

In this way, the combined vertical translation movement of the rail 120 and sliding travel of the unit 119 along the rail 120 performs the operation of packing the object with the film which is spiralling wound around the object.

From FIG. 5 it can be seen how the rail 120 (and therefore the carriage path) may not be circular. It is therefore possible to optimize the size of the machine in the case of objects which have dimensions which vary greatly in the two orthogonal directions.

It is in fact clear how it is possible to provide wrapping paths which are closed, but not circular with varying forms (for example, as can be seen in FIG. 5, a rectangular path with radiused corners) so as to follow the form of the objects to be packaged and not have to provide machines with circular rings which have a diameter adapted to the greater dimension and which are therefore unnecessarily bulky along the smaller dimension.

Advantageously, as can be clearly seen again in FIG. 5, the unit 119 may also be constructed in the form of segments hinged with each other and arranged in series on the rail, so as to be able to travel easily along a rail 120 even with sudden changes in curvature and direction along its travel path. The various hinged segments (for example three segments) may each support part of the unwinding system, namely the reel of film and the motor-driven unwinding rollers and, where applicable, pre-stretching rollers. For example, with the device similar to that shown in FIG. 4, the first segment may support the reel of film 34, the second segment may support the motor-driven roller 35 and the third segment may support the motor-driven roller 36.

As may be easily imagined by the person skilled in the art, a jockey wheel or other mechanisms for regulating unwinding and tensioning of the film may also be mounted on the unit 119.

If it is required to provide a circular travel path (namely with the rail 120 in the form of a circular ring), the unit 119 may in any case have more simply a rigid design (if necessary curved in the manner of the rail), since it must travel along a rail 120 with a substantially constant curvature.

In any case, a power supply antenna 125 is present along the closed path followed by the dispensing unit 119 and is connected to an antenna power supply unit 126 for transferring, by means of electrical induction, electric power to a corresponding receiver 128 which is movable along the antenna together with the dispensing unit 119 and provides in turn electric power to the said dispensing unit, as described for the previous embodiment.

Figure 6:
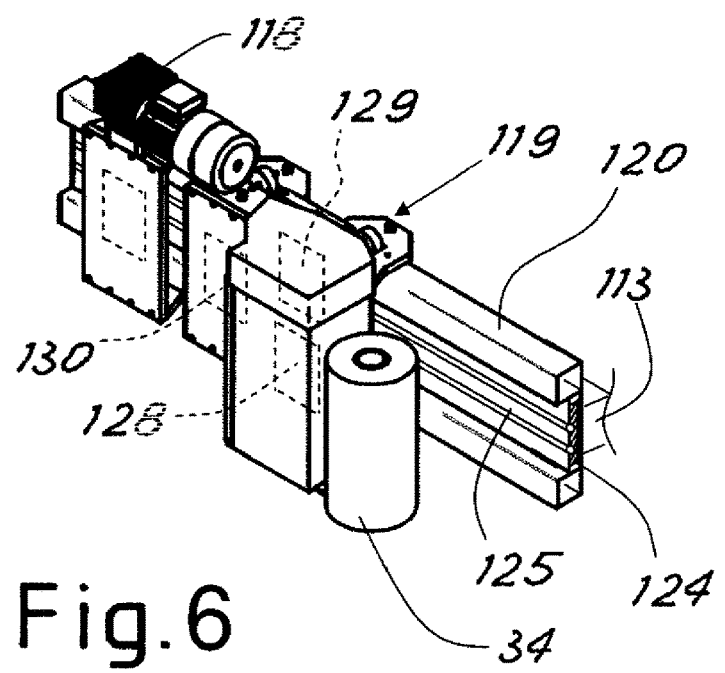
FIG. 6 shows a schematic perspective view of a part of the wrapping machine according to FIG. 5.

As clearly shown in FIG. 6, the antenna (preferably formed by two loops as described for the previous embodiment) is advantageously housed in a seat in an annular support which, in the example of embodiment, coincide substantially with a part of the same rail along which the carriage travels.

As can be seen in FIG. 6, a metallic screen 124 (advantageously a U-shaped profile) lining the seat of the antenna on three sides may also be provided in order to prevent irradiation in directions other than those where the transmitting antenna 125 and receiver 128 are coupled together.

The receiver 128 supplies power to an electronic control unit 129 which is mounted on the dispensing unit and which controls the operation of motors and/or actuators present on the unit 119. In particular, a drive motor 118 which moves the unit along the rail is advantageously provided, along with further drive elements and/or actuators 134 for performing unwinding of the reel and, if necessary, pre-stretching of the film as, for example, already described with reference to FIG. 4.

In similar manner to the preceding embodiment, the apparatus shown in FIG. 5 may also comprise a central control unit 131 which communicates with the mobile unit 129 by means of a wireless connection (via an associated transceiver 132 known per se). The central unit may have a known input/output interface for an operator.

The wireless connection may be advantageously performed by means of the same antenna 125. Alternatively, separate antennas may be provided.

Owing to the wireless connection, the central control unit may send commands to the unit mounted on the carriage and regulate the various operating parameters thereof, such as the dispensing speed, degree of pre-stretching, speed of movement along the rail, etc. At this point it is clear how the predefined objects have been achieved.

In a wrapping machine according to the invention the problems of equipping the rotating dispensing unit with electrical and electronic components no longer exist, since the electrical power supply is in all cases ensured in an easy and low-cost manner. Since there is no need for complex moving mechanical parts for transmission of the movement, nor sliding electrical contacts, electric batteries or dynamos, the system according to the invention is relatively low-cost, sturdy and reliable and does not require a lot of maintenance. The rotating system may be designed so as to be relatively light and have a low inertia. The packaging speed may therefore be high and the power consumption limited.

Obviously the description provided above of an embodiment applying the innovative principles of the present invention is provided by way of example of these innovative principles and must therefore not be regarded as limiting the scope of the rights claimed herein.

For example, the dispensing unit may be designed in various other ways, which may now be easily imagined by the person skilled in the art, with a variable number of electrical actuators and motors, according to the specific needs. This unit may also comprise various known optional packaging accessories, as may be easily imagined by the person skilled in the art. The machine may also have forms and dimensions which differ depending on the practical requirements.

The sliding carriage system according to the second embodiment may also be, for example, moved vertically by means of a projecting frame and two motor-driven end columns, as shown in FIG. 1 or, vice versa, the rotating ring of the system according to FIG. 1 may be moved by four lateral columns, as shown in FIG. 5.

Moreover, in the sliding-carriage embodiment also, the antenna may be arranged in an annular support separate from the rail and parallel to the carriage path.

As is clear from the figures, advantageously the antenna may be formed by an electric cable inserted inside grooves within an insulating element (for example made of plastic) inserted in the support element.

As may be now easily imagined by the person skilled in the art, the system according to the invention may also be designed for horizontal packages (namely with the unit 19 or 119 which rotates about a horizontal axis instead of a vertical axis and which travels horizontally instead of vertically). As mentioned above, in the case of sufficient width of the film, the machine may also be designed without displacement of the film dispensing unit along the product.

The wireless communication system may also be of a known optical type.

The invention claimed is:

1. Wrapping machine for packaging products using a film unwound from a reel, comprising a frame carrying a dispensing unit which is electrically operated to dispense the packaging film from a reel of film present in the dispensing unit, the dispensing unit being supported on the frame so as to be driven rotationally along a closed path around a packaging zone which contains a product to be wrapped with the film, wherein:

the dispensing unit comprises an assembly of electric motors and/or electric actuators thereon;

said closed path includes a power supply antenna connected to an antenna power supply unit, wherein a power supply receiver is movable along the power supply antenna together with said dispensing unit, wherein the power supply antenna is configured for transferring, by means of electrical induction, electric power from the antenna power supply unit to the power supply receiver; and the dispensing unit comprises an electronic control unit that is mounted on the dispensing unit and is configured to receive the electric power from said power supply receiver and to supply the electric power to, and control operation of, the assembly of electric motors and/or electric actuators on the dispensing unit.

2. Machine according to claim 1, characterized in that the frame is in turn supported movably so as to be translatably driven in a direction transverse to the breadth of said closed path, so as to displace the closed path along the said product packaging zone.

3. Machine according to claim 2, characterized in that the closed path is substantially horizontal and the movement of the frame occurs vertically along motor-driven vertical-travel columns.

4. Machine according to claim 1, characterized in that devices for pre-stretching the film are present in the dispensing unit and the said assembly of motors and/or actuators operate at least these pre-stretching devices.

5. Machine according to claim 4, characterized in that the pre-stretching devices comprise at least two rollers for feeding the dispensed film, which are separately motor-driven and operated by the mounted control unit so as to adjust the relative speed of the rollers and obtain a desired degree of pre-stretching.

6. Machine according to claim 1, further comprising a central control unit which communicates with the control unit mounted on the dispensing unit by means of a wireless transmission.

7. Machine according to claim 6, characterized in that the wireless transmission passes via the power supply antenna.

8. Machine according to claim 1, characterized in that the dispensing unit, for its movement along the closed path, is supported on a circular guide ring which axially rotates on the frame by means of a rotational motor.

9. Machine according to claim 8, characterized in that the ring rotates on the frame by means of guiding and sliding means comprising rollers for supporting and laterally guiding the ring, which are distributed on the frame along the perimeter of the ring.

10. Machine according to claim 1, characterized in that the antenna is seated inside an annular support arranged parallel to the said travel path.

11. Machine according to claim 1, characterized in that the dispensing unit is in the form of a motor-driven carriage which travels on a rail mounted on said frame and which follows the said closed path.

12. Machine according to claim 11, characterized in that the antenna is housed inside a seat in the rail.

13. Machine according to claim 11, characterized in that the carriage is formed by hinged segments arranged in series on the rail.

14. Machine according to claim 1, characterized in that it comprises a conveying line for moving the products inside and outside of the packaging zone.

15. Machine according to claim 1, wherein the assembly of motors and/or actuators and the electronic control unit are distinct elements.

* * * * *